United States Patent [19]

Rogers et al.

[11] Patent Number: 5,012,839
[45] Date of Patent: May 7, 1991

[54] HEATED PLASTIC FLOW CONTROL VALVE

[75] Inventors: David J. Rogers, Belchertown; Martin J. Broga, Springfield, both of Mass.

[73] Assignee: The Hanson Group Ltd., Ludlow, Mass.

[21] Appl. No.: 486,873

[22] Filed: Mar. 1, 1990

[51] Int. Cl.⁵ .................. B29C 45/20; F16K 49/00
[52] U.S. Cl. .................................... 137/341; 425/563
[58] Field of Search .................. 137/341; 251/149.6; 425/562, 563, 564

[56] References Cited

U.S. PATENT DOCUMENTS 2,230,785 2/1941 Sundback .
2,359,840 10/1944 Goessling .
2,804,6749 9/1957 Hupfield .
3,295,169 1/1967 Moslo ............................ 425/563 X
3,398,436 8/1968 Nouel ............................ 425/563 X
3,590,114 6/1971 Uhlig .
3,810,728 5/1974 Jacobs .
3,934,626 1/1976 Hall ..................................... 425/563
3,941,540 3/1976 Driscoll et al. ...................... 425/563
4,048,275 9/1977 Usamoto et al. .
4,073,469 2/1978 Kodric ............................ 137/341 X Primary Examiner—Stephen M. Hepperle
Attorney, Agent, or Firm—Jones, Tullar & Cooper

[57] ABSTRACT

A heated plastic flow control valve assembly which is intended for use in controlling the flow of molten plastic to a mold in a molding press includes a spring biased slide valve that cooperates with a valve body to shut of plastic flow unless the slide valve is displaced against the spring. This displacement is caused by engagement of a plastic injection machine nozzle with the slide valve. Two separately controllable heaters are useable to provide two heat zones in the valve assembly.

23 Claims, 2 Drawing Sheets

HEATED PLASTIC FLOW CONTROL VALVE

FIELD OF THE INVENTION

The present invention is directed generally to a flow control valve assembly. More particularly, the present invention is directed to a shut off valve assembly for molten plastic. Most specifically, the present invention is directed to a heated plastic flow control valve assembly for use in plastic molding. The flow control valve assembly is primarily useable with molds mounted in a vertical molding press assembly. Molds of this type frequently use hot runners to direct the molten plastic to the mold cavities. The heated plastic flow control or shut off valve assembly of the present invention cooperates with a plastic injection nozzle that engages the valve assembly and through which the molten plastic flows into through the hot runner manifold and the mold cavities. As the mold and the nozzle are separated, the valve assembly positively shuts off flow of the molten plastic and prevents seepage or drooling of the molten plastic from the hot runners of the mold.

DESCRIPTION OF THE PRIOR ART

Various techniques of plastic molding are in widespread use and are utilized to create a wide range of highly useful products.

In today's society the use of plastic molded articles has become well established. A typical molded plastic article is made by filling a mold cavity with a molten plastic, allowing the plastic to cool and solidify, and then removing the molded article from the mold cavity. In most such plastic molds, the mold cavity is defined by at least two mold elements that cooperate to form the cavity which defines the shape of the article being molded.

One generally well known type of plastic molding apparatus is a vertical molding press in which two press elements, or platens, move vertically during opening or closing. This type of molding press often uses so-called cold runners or passages through which the molten plastic flows to the mold cavity. In these presses, the nozzle which injects the plastic into the mold cavity quite often engages the mold at the parting line where the mold halves split. In these cold runner presses, the cold solidified plastic in the runner is either discarded or is reground and reused. Either situation creates waste plastic, lost time, or both. This waste, in turn, costs money.

In an effort to eliminate the wastes inherent in a cold runner press molding process, the industry has turned to a hot runner procedure. In these types of vertical presses, hot runner manifold assemblies in the molds provide heated plastic melt flow passages. These hot runners are frequently located in the upper half of the mold assembly. A molten plastic injection machine nozzle typically engages the hot runner network in the top half of the mold. Before the press halves can be separated to allow removal of the molded plastic article, the nozzle must be separated from the hot runner network in the press mold. This separation pulls the nozzle out of its seat in the upper mold half and molten plastic in the hot runner is apt to start to drool out.

Drooling or seepage of molten plastic from the hot runner system, as has been the situation in presently available vertical molding presses using hot runners clearly causes problems. The seepage or drooling of the molten plastic obviously wastes material. Such a waste of material increases operating costs and thus reduces profits. Additionally, the drooling plastic is apt to run out of the hot runner manifold and against the vertical mold. An accumulation of this plastic may adversely effect the operation of the mold. The mold halves may not close properly and the plastic coating may inhibit proper heat exchange during mold cooling Further, this seepage or drooling of the molten plastic may give rise to partial voids in the hot runners and thus may lead to incomplete mold cavity charging. In any of these instances, the end result is the wasting of plastic material, time, and possibly equipment.

While the use of hot runners in vertical molding presses has eliminated the waste of plastic caused by cold runner applications, the drooling of molten plastic in the hot runner process has remained a problem. There has been a need for a heated or molten plastic flow control arrangement which will prevent this plastic seepage or drooling. The heated plastic flow control valve assembly of the present invention, as will be discussed in detail shortly, provides a solution to this problem and is a significant advance in the art.

SUMMARY OF THE INVENTION

It is an object of the present invention to provide a flow control valve assembly.

Another object of the present invention is to provide a heated plastic flow control valve.

A further object of the present invention is to provide a heated plastic flow control valve assembly for a vertical molding press.

Yet another object of the present invention is to provide a heated plastic shut off valve.

Still a further object of the present invention is to provide a heated flow control valve for use in shutting off the flow of molten plastic.

Even another object of the present invention is to provide a heated flow control valve for a heated runner in a vertical molding press.

Yet still a further object of the present invention is to provide a heated flow control valve to stop plastic drool.

As will be discussed in greater detail in the description of the preferred embodiment which is set forth subsequently, the heated plastic flow control valve assembly in accordance with the present invention utilizes a slide valve which is telescopingly slidable with respect to a valve body to provide positive flow control for molten plastic. The slide valve has a central plastic flow passage whose discharge openings are closed when the discharge end of the slide valve telescopes within the valve body. A coil spring surrounds the slide valve and provides the valve closing force. The body of the valve assembly is surrounded by a band heater while the sprue core portion of the valve assembly, which cooperates with the hot runner manifold in the mold, is provided with a coil heater. These two heaters are individually controllable to ensure that the plastic material in the valve assembly is kept at the proper temperature.

The heated plastic flow control valve of the present invention is useable primarily with a hot runner manifold in a mold secured in a vertical molding press to prevent plastic drool or seepage when the molten plastic injection nozzle is separated from the mold. As the nozzle is separated from the hot runner manifold of the mold, the spring within the body that surrounds the slide valve causes the discharge end of the slide valve to move into the valve body. This closes off the discharge openings in the slide valve and thereby stops the flow of plastic. When the nozzle re-engages the end of the slide valve in the valve assembly, the coil spring is compressed, thus allowing the plastic discharge openings in the slide valve to move out of the valve body so that the molten plastic can flow through the slide valve, the sprue core, and into the hot runner manifold.

In significant contrast to the prior art, the heated plastic flow control valve assembly of the present invention prevents seepage or drooling of plastic material when the machine nozzle is retracted from the mold. This prevention of seepage or drooling keeps press surfaces unfouled and insures that the hot runner manifold is fully charged with plastic. This means that the mold receives a full charge of molten plastic so that there are no defectively molded articles. The provision of a band heater around the body of the assembly and of a separate coil heater around the sprue core allows both of these areas to have their temperatures controlled independently. This keeps the residual plastic in these areas at the proper temperatures. Each heater is independently controlled and each is operable over a wide range of temperatures so that the proper temperature can be provided for a number of different plastics that are to be molded.

The heated plastic flow control valve assembly of the present invention provides significant cost savings. It is no longer necessary to discard or re-grind the excess molded plastic that resulted from the useage of cold runners. The molding of numerous plastic articles can be accomplished using hot runners without the previous problem of hot plastic drool. The heated plastic flow control valve assembly provides a positive workable solution to a long-standing problem and represents a substantial advance in the art.

BRIEF DESCRIPTION OF THE DRAWINGS

While the novel features of the heated plastic flow control valve assembly in accordance with the present invention are set forth with particularity in the appended claims, a full and complete understanding of the invention may be had by referring to the detailed description of the preferred embodiment which is set forth subsequently, and as illustrated in the accompanying drawings in which;

DESCRIPTION OF THE PREFERRED EMBODIMENT

Figure 1:
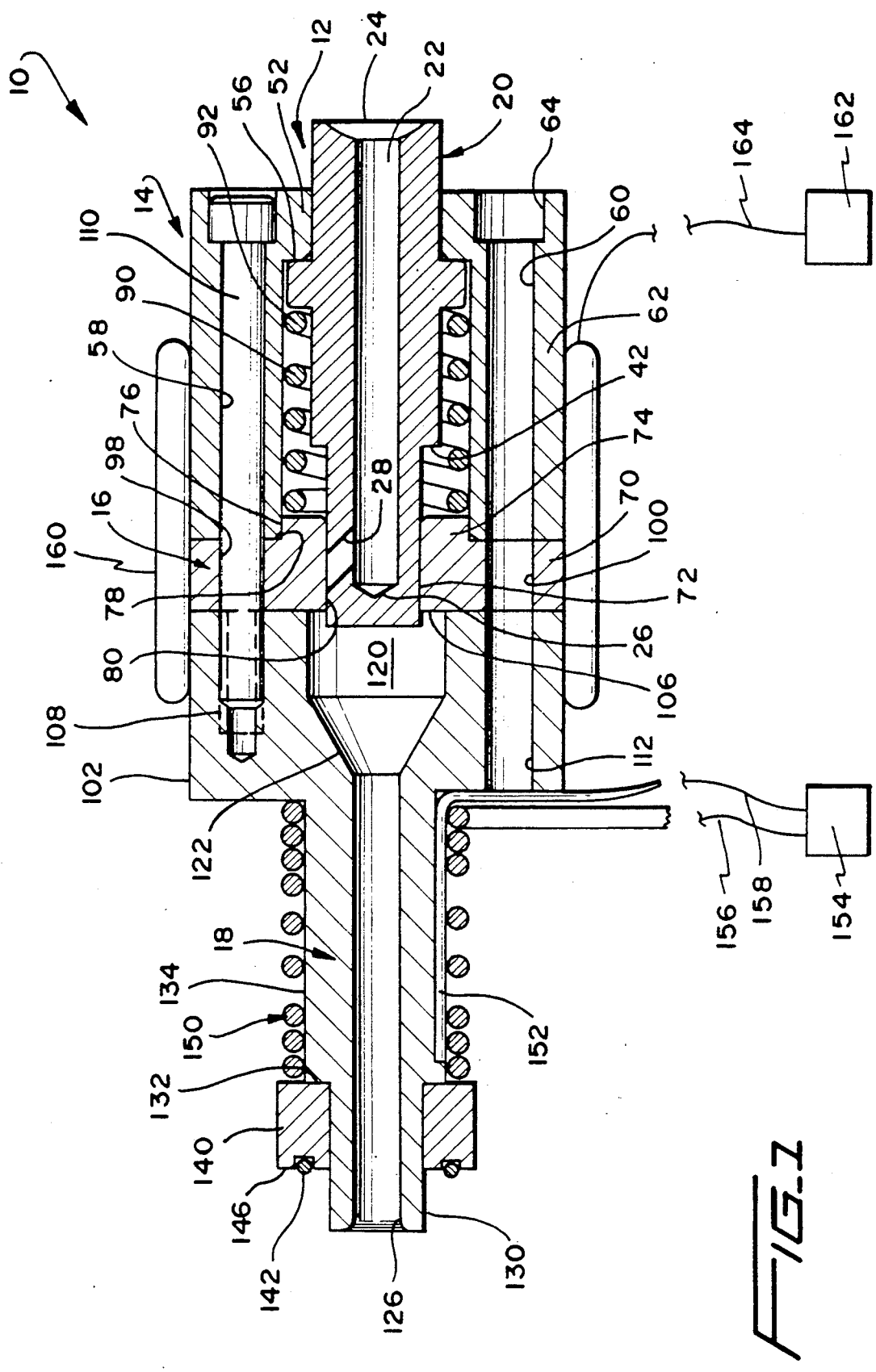
FIG. 1 is a sectional side elevation view of the heated plastic flow control valve assembly of the present invention and showing the valve assembly in the flow shut off position.

Referring initially to FIG. 1, there may be seen, generally at 10, a preferred embodiment of a heated plastic flow control valve assembly in accordance with the present invention. Valve assembly 10 is primarily intended for use as a molten plastic shut-off valve that is useable with a hot runner assembly in a mold which is intended for use in a vertical molding press. Since the environment in which valve assembly 10 is primarily intended to function is generally well known in the art, it will not be discussed in detail. A general overview of the environment in which the valve assembly 10 of the present invention is intended to operate may be had by referring to U.S. Pat. No. 3,941,540 to Driscoll et al. In that patent, and its parent patent, No. 3,767,340 there is shown a sprue bushing for a single cavity or center sprued mold. The sprue bushing 25 of that prior patent is depicted as being useable in a horizontal molding press in which the mold halves move horizontally with respect to each other. Further, in this prior art patent, the sprue bushing 25 directly engages the mold cavity instead of a hot runner system as is the case in the present invention. However, as indicated above, this prior patent is of general interest in its depiction of the general environment in which the heated plastic flow control valve assembly 10 of the present invention is primarily intended for use.

Referring again to FIG. 1, heated plastic flow control valve assembly 10 includes a slide valve, generally at 12, which is slidably supported in a body 14, and which cooperates with a valve body 16 to control flow of molten plastic through a sprue core 18 into and out of a hot runner system of a mold which is used in a vertical molding press (not shown). As is known by those of skill in the art, a hot runner system is a distribution network, typically within a mold plate, through which molten plastic is caused to flow to a plurality of mold cavities in the mold. While the mold cavities themselves are provided with cooling systems to cool and solidify the plastic which is forced through the hot runners and into the mold cavities, the plastic in the hot runners stays molten and thus in a flowable state. Without the attachment of the heated plastic flow control valve assembly 10 of the present invention to the terminus of the hot runner network of a generally well known mold plate carried in a vertical molding press, when the machine nozzle, which supplies the molten plastic to the hot runner manifold, is removed, the molten plastic in the hot runner will "drool" or flow back out of the hot runners and, as discussed previously, will waste plastic.

Figure 5:
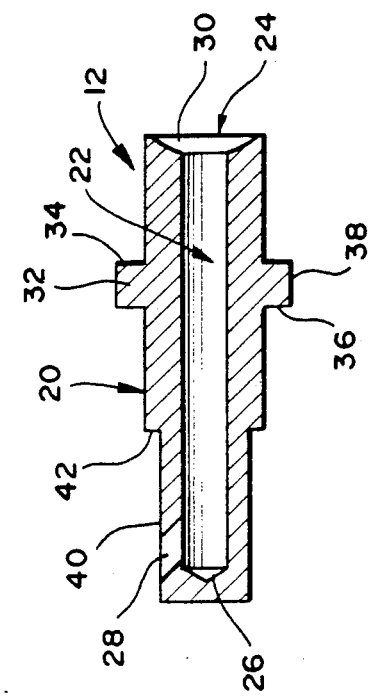
FIG. 5 is a sectional side elevation view of the slide valve portion of the heated plastic flow control valve assembly.

Slide valve 12, as may be seen in FIGS. 1 and 5 is generally in the shape of an elongated rod 20 which has a central bore 22 that extends into rod 20 from a first or inlet end 24 and which terminates within the rod 20 in a blind inner or second end 26. A plurality of discharge orifices 28 are arranged in a spaced, generally radially extending configuration adjacent the blind second end 26 of central bore 22 of slide valve 12. In the preferred embodiment, there are three such discharge orifices 28. The inlet end 24 of the central blind bore 22 in slide valve 12 is provided with a generally concave nozzle seat 30. This allows the slide valve 12 to easily mate with the generally spherically shaped ends of most molten plastic machine injection nozzles. This allows molten plastic to be easily and expeditiously fed from a machine nozzle into the bore 22 in slide valve 12 of the valve assembly 10.

Referring again primarily to FIG. 5, rod 20 has a stepped and flanged outer surface. A generally radially outwardly extending flange 32 is formed on rod 20 and is positioned intermediate the discharge orifices 28 and the nozzle seat 30. This flange 32 has generally planar side surface 34 and 36 and an outer peripheral surface 38 which is generally parallel to the axis of blind bore 22. The portion of rod 20 adjacent discharge orifices 28 has an outer surface 40 of reduced diameter and this reduced diameter portion 40 of rod 20 terminates in a step 42 which is formed generally midway between discharge orifices 28 and flange 32. The functional significance of this structural configuration will be discussed shortly.

Figure 4:
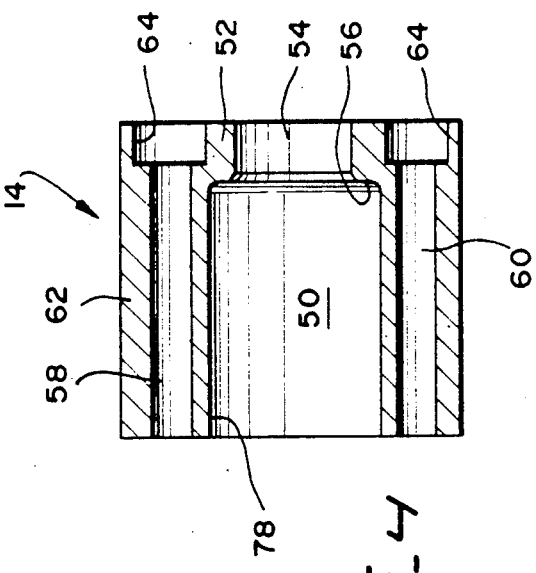
FIG. 4 is a sectional side elevation view of the body of the valve assembly.

Again turning to FIG. 1, taken in consideration with FIG. 4, slide valve 12 is slidably supported in body 14. The shape of body 14 is generally cylindrical and defines a central cavity 50 within which slide valve 12 is situated. A radially inwardly directed lip 52 is provided at a first end of body 14 and forms a reduced diameter opening 54 that is sized to slidably receive the first or outer end of slide valve 12. Lip 52 has an inner surface 56 which will abuttingly engage the first side surface 34 of flange 32 of slide valve 12 to thereby limit sliding travel of slide valve 12 in a first direction in cavity 50 of body 14. The diameter of the major portion of central cavity 50 in body 14 is sized to slidably cooperate with the peripheral surface 38 of flange 32 of slide valve 12. Thus, slide valve 12 is slidably supported in body 14. A plurality of first and second through bores 58 and 60, respectively are formed in the wall 62 of body 14. These may be provided with suitable countersunk recesses 64 at their ends adjacent the reduced diameter opening 54 in the inlet end of body 14. Their purpose will be discussed subsequently.

As is shown in FIG. 1, valve body 16 is generally shaped as a disk 70 with a central slide valve opening 72 that is surrounded by an annular hub 74. An outer diameter 76 of hub 74 is dimensioned to fit within a second, inner end 78 of cavity 50 of body 14. The reduced diameter surface portion 40 of the inner end of slide valve 14 is slidably receivable in the central slide valve opening 72 of valve body 14. As may be seen in FIG. 1, an inner surface 80 of slide valve opening 72 closes off the several discharge orifices 28 in slide valve 12 when the slide valve 12 is situated as depicted in FIG. 1.

A coil spring 90 is carried in central cavity 50 of body 14 and is concentric with the outer surfaces of the slide valve 12. A first end 92 of coil spring 90 engages the second side face 36 of radial flange 32 while a second end 94 of spring 90 abuts the annular hub of valve body 14. The coil spring 90 thus is effective to keep slide valve 18 in its closed position, as depicted in FIG. 1. When a suitable compressive force is applied to the inlet end 24 of the rod 20 of slide valve 12, the spring 90 will compress and allow the discharge orifices 28 of slide valve 12 to slide to the left, as seen in FIG. 1, to move out of cooperation with valve body 16 and to allow molten plastic to flow through the valve assembly 10. Compression of spring 90 is limited by abutment of step 42 of slide valve 12 with hub 74 of valve body 16. The valve body 16 is provided with a plurality of first and second spaced through bores 98 and 100, respectively which will align with the cooperating spaced first and second through bores 58 and 60 in body 12.

Figure 3:
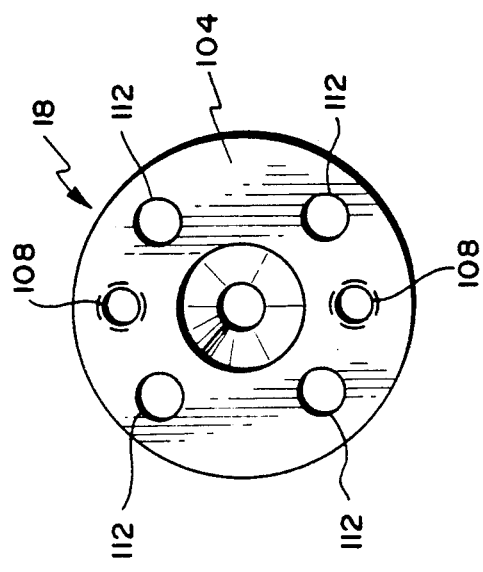
FIG. 3 is an end view of the sprue core of FIG. 2.
Figure 2:
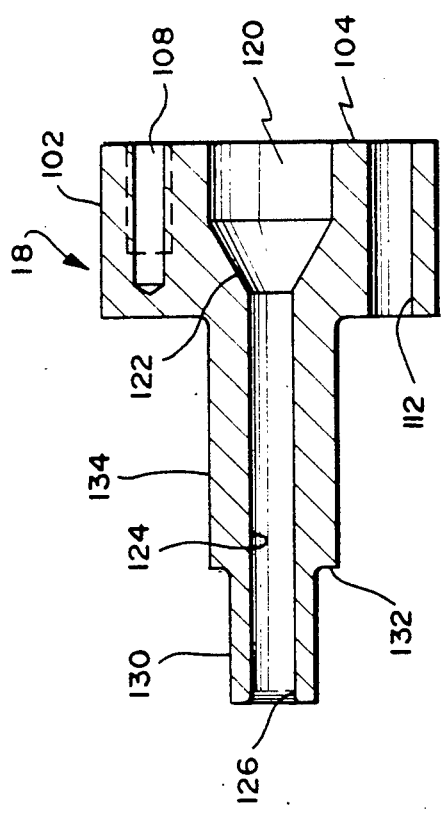
FIG. 2 is a sectional side elevation view of the sprue core of the valve assembly.

Sprue core, generally at 18 is shown as part of valve assembly 10 in FIG. 1 and by itself in FIGS. 2 and 3. As may be seen most clearly in FIG. 2, sprue core 18 has an annular flange 102 with a first side surface 104 that is in abutting engagement with a flat side surface 106 of valve body 14 when the valve assembly 10 is put together. Spaced tapped holes 108 are formed in the annular flange 102 and these align with the first through bores 58 and 98 in body 14 and valve body 16. respectively. Screw threaded cap screws 110 are placed through these aligned first bores 58 and 98 and are seated in the tapped holes 108. These provide a means for holding the body 14, valve body 16 and sprue core 18 together to form the valve assembly 10. A plurality of through bores 112 are also formed in annular flange 102 of sprue core 18. These bores align with the second through bores 60 and 100 in the body 14 and valve body 16, respectively and provide a means for facilitating the securement of the valve assembly 10 to the upper plate of an injection mold assembly.

A slide valve discharge end receiving chamber 120 is located in the central portion of annular flange 102 of sprue core 18, as seen most clearly in FIG. 2. This chamber 120 is of suitable size to allow the inner end of slide valve 12 to be forced thereinto and to allow molten plastic to flow freely from the discharge orifices 28 into chamber 120 when the valve assembly is open. An inwardly tapering wall 122 provides a transition between chamber 120 and a sprue passage 124. This sprue passage 124 terminates in a sprue opening 126 which will be in fluid flow communication with the hot runner system (not shown) of the injection mold.

An outer surface of sprue core 18, which defines the sprue passage 124, has a first stepped-down periphery 130 that is adjacent sprue opening 126, as seen in FIG. 2. This stepped down periphery 130 ends at a sprue passage step 132 at which point the circumference of the outer surface of the sprue core increases. This intermediate sprue core surface 134 extends until it terminates at the sprue core annular flange 102. An annular seal spacer 140 is supported on the stepped down periphery 130 of sprue core 18, as may be seen in FIG. 1. This seal spacer carries a metal "O"-ring 142 in an "O"-ring groove 144 formed on a vertical face 146 of seal spacer 140. This seal spacer is sized to slide on stepped down periphery 130 and to abut sprue passage step 132. Thus when the sprue opening end 126 of sprue core 18 is inserted into an opening in the mold as the valve assembly 10 is attached to the mold by use of suitable screws or bolts which will be passed through aligned second bores 60, 100 and 112 in body 14, valve body 16 and sprue annular flange 102, respectively, the seal spacer 140 and its associated O-ring 142 will form a tight, leak proof seal.

A coil heater 150 is placed about the intermediate sprue core surface 134, as seen in FIG. 1. A suitable temperature sensing means, such as a thermocouple 152 is interposed between the coil heater 150 and surface 134. The coil heater 150 and thermocouple 152 are connected to a suitable temperature controller, depicted schematically at 154, by suitable electric leads 156 and 158, respectively. A band heater 160 engages the coextending outer surfaces of body 14, valve body 16 and annular flange 102 of sprue core 18. This band heater 160 is controllable by a temperature controller 162 to which it is connected by a suitable electric lead 164. If desired, a separate temperature measuring device (not specifically shown) can be utilized with band heater 160 in a manner similar to that used with coil heater 150. The coil heater 150 and band heater 160 provide two separate heat zones for the valve assembly 10 of the present invention. The plastic in the sprue passage 124 is kept molten by the coil heater 150 while the plastic in the area of the slide valve 12 is kept molten by the band heater 160. These two heat zones can be maintained at separate desired temperatures, generally in the range of from about 200° to 600°, depending on the plastic material being used. The separate temperature controllers 154 and 162 can be combined into a single two zone controller, if desired.

In operation, the heated plastic flow control valve assembly 10 of the present invention is assembled, as shown in FIG. 1, and is attached to a mold, typically a multi-cavity mold having hot runners. The sprue opening 126 is positioned so that it is in fluid flow communication with the manifold or hot runner system of the mold. The valve assembly 10 will typically be closed, as shown in FIG. 1 and will prevent reverse flow of molten plastic back through the hot runners and out of the mold. Such reverse plastic flow creates "drooling" which has resulted in lost plastic and in press fouling. After the top and bottom press platens have been brought together to close the mold cavities, a molten plastic injection machine nozzle will be brought into contact with the nozzle seat 30 on the slide valve 12. As the machine nozzle is forced against the nozzle seat 30, the coil spring 90 will compress and will allow the inner end of the slide valve 12 to slide into the slide valve discharge end receiving cavity 120 in the sprue core 18. This opens the several spaced slide valve discharge orifices 28 since they will slide clear of the flat side surface 106 of the valve body 16. As long as the slide valve 12 is forced inwardly by the machine nozzle, molten plastic will flow through the valve assembly 10 and to the hot runner system. As soon as the machine nozzle is retracted, the coil spring 90 will force the slide valve 12 into the shut off position shown in FIG. 1. In this shut off position the reverse flow of molten plastic back out of the hot runners is precluded by the positive shut off action provided by the heated plastic flow control valve assembly of the present invention.

While a preferred embodiment of a heated plastic flow control valve in accordance with the present invention has been set forth fully and completely hereinabove, it will be apparent to one of skill in the art that a number of changes in, for example the types of metal or the like used in the fabrication of the valve assembly, the type of temperature controllers, the particular configuration of the molding press and the like may be made without departing from the true spirit and scope of the present invention which is accordingly to be limited only by the following claims.

What is claimed is:

1. A heated plastic flow control valve assembly useable to control flow of molten plastic to and from a mold in a molding press, said valve assembly comprising:

a slide valve having a plastic flow passage, said slide valve being slidable between a closed position in which flow of plastic through said plastic flow passage is prevented and an open position in which flow of plastic through said plastic flow passage is allowed;

a plurality of plastic discharge orifices formed in said slide valve at a discharge end of said plastic flow passage;

a valve body which slidably supports said slidable slide valve for movement of said slide valve between said open and closed positions, said valve body having a central slide valve opening which closes off said plurality of plastic discharge orifices in said slide valve when said slide valve is in said closed position;

means for biasing said slide valve to said closed position;

a sprue core having an elongated sprue passage in plastic flow communication with said plurality of plastic discharge orifices in said slide valve when said slide valve is in said open position in said valve body and in plastic flow communication with a mold to direct a flow of plastic from said slide valve to a mold; and means to heat said valve assembly.

2. The valve assembly of claim 1 wherein said slide valve is generally rod shaped and further wherein said plastic flow passage is a central blind bore in said rod.

3. The valve assembly of claim 2 wherein said slide valve has an inlet to said central bore which is shaped to cooperatively mate with a plastic machine injection nozzle.

4. The valve assembly of claim 1 further including a body secured to said valve body, said slide valve being slidable in said body.

5. The valve assembly of claim 4 wherein said body and said valve body cooperate to define a cavity within which said slide valve is slidable.

6. The valve assembly of claim 5 wherein said means for biasing said slide valve to said closed position is a spring.

7. The valve assembly of claim 6 wherein said spring is a coil spring which is concentric with said slide valve in said cavity.

8. The valve assembly of claim 7 wherein said slide valve is generally rod shaped and includes a radially outwardly extending flange.

9. The valve assembly of claim 8 wherein said coil spring has a first end which abuts said radially outwardly extending flange on said slide valve.

10. The valve assembly of claim 9 wherein said coil spring has a second end which abuts said valve body.

11. The valve assembly of claim 1 wherein said sprue core includes a slide valve discharge end receiving chamber into which a flow of plastic from said slide valve will be directed.

12. The valve assembly of claim 11 wherein said slide valve discharge end receiving chamber in said sprue core is connected to said sprue passage by an inwardly tapering wall.

13. The valve assembly of claim 12 wherein said sprue passage terminates in a sprue opening through which molten plastic is flowable to a mold when said slide valve is in said open position.

14. The valve assembly of claim 13 wherein a seal spacer is disposed on said sprue core generally adjacent said sprue opening.

15. The valve assembly of claim 14 wherein said means to heat said valve assembly includes a coil heater which overlies said sprue core intermediate said seal spacer and said slide valve discharge end receiving cavity.

16. The valve assembly of claim 15 wherein said means to heat said valve assembly further includes a band heater which overlies said slide valve.

17. The valve assembly of claim 16 further including means to independently control said coil heater and said band heater.

18. The valve assembly of claim 15 further including a thermocouple in contact with said coil heater.

19. A heated plastic flow control valve assembly useable to control flow of molten plastic to and from a mold in a molding press, said valve assembly comprising:

a slide valve having a plastic flow passage and being positionable in a closed position in which flow of plastic through said plastic flow passage is prevented;

a valve body which slidably supports said slide valve for movement between said closed position and an open position in which flow of plastic through said plastic flow passage in said slide valve is allowed;

means for biasing said slide valve to said closed position;

a sprue core in plastic flow communication with said slide valve and said valve body and a mold to direct a flow of plastic from said slide valve to a mold, said sprue core including a slide valve discharge end receiving cavity into which a flow of plastic from said slide valve will be directed;

a sprue passage in said sprue core, said sprue passage being connected at a first end to said slide valve discharge end receiving cavity by an inwardly tapered wall, and terminating at a second end in a sprue opening through which molten plastic is flowable to a mold when said slide valve is in said open position;

a seal spacer disposed on said sprue core generally adjacent said sprue opening; and means to heat said valve assembly.

20. The valve assembly of claim 19 wherein said means to heat said valve assembly includes a coil heater which overlies said sprue core intermediate said seal spacer and said slide valve discharge end receiving cavity.

21. The valve assembly of claim 20 wherein said means to heat said valve assembly further includes a band heater which overlies said slide valve.

22. The valve assembly of claim 21 further including means to independently control said coil heater and said band heater.

23. The valve assembly of claim 20 further including a thermocouple in contact with said coil heater.

* * * * *